US006551357B1

United States Patent
Madduri (12) United States Patent
(10) Patent No.: US 6,551,357 B1
(45) Date of Patent: Apr. 22, 2003

(54) METHOD, SYSTEM, AND PROGRAM FOR STORING AND RETRIEVING MARKINGS FOR DISPLAY TO AN ELECTRONIC MEDIA FILE

(75) Inventor: Hari Haranath Madduri, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/249,202

(22) Filed: Feb. 12, 1999

(51) Int. Cl.[7] .............................................. G06F 15/00
(52) U.S. Cl. ...................... 715/512; 715/522; 715/528; 715/530; 345/592
(58) Field of Search ................................. 707/530, 512, 707/528, 529, 522; 345/589, 592; 715/512, 522, 528, 530

(56) References Cited

U.S. PATENT DOCUMENTS

| | | | |
|---|---|---|---|
| 5,146,552 A | | 9/1992 | Cassorla et al. ............ 707/512 |
| 5,530,794 A | | 6/1996 | Luebbert .................... 707/524 |
| 5,732,219 A | | 3/1998 | Blumer et al. .............. 709/227 |
| 5,802,380 A | | 9/1998 | Bangs et al. ................ 707/515 |
| 5,893,126 A | * | 4/1999 | Drews et al. ................ 345/781 |
| 5,920,694 A | * | 7/1999 | Carleton et al. ............ 345/753 |
| 6,041,335 A | * | 3/2000 | Merritt et al. .............. 707/512 |
| 6,230,170 B1 | * | 5/2001 | Zellweger et al. .......... 345/467 |
| 6,262,728 B1 | * | 7/2001 | Alexander ............... 345/440.1 |
| 6,332,148 B1 | * | 12/2001 | Paine et al. .................. 707/512 |
| 6,389,435 B1 | * | 5/2002 | Golovchinsky et al. ..... 345/764 |

OTHER PUBLICATIONS

"Method for Indicating keywords in Document", IBM Technical Disclosure Bulletin, Jan. 1998, pp. 81–82.*
Malcolm, Nicholas and Baines, Brian R., *A Minimalist Approach to the Development of a Word Processor Supporting Group Writing Activities*, Knowledge Science Institute, University of Calgary, Calgary, Alberta, Canada, 1991.
Ackerman, Shirley S. and Turechek, William W., *The Risks and Rewards of Online Editing*, IEEE Transactions on processional Communication, vol. 31, No. 3, Sep. 1988.
S. Ackerman, W. Turecheck, and R. Wright, *Online Publication Editing System*, IBM Technical Disclosure Bulletin, vol. 36, No. 06A,Jun. 1993.

* cited by examiner

Primary Examiner—Stephen S. Hong
Assistant Examiner—Thu V. Huynh
(74) Attorney, Agent, or Firm—David W. Victor; Konrad Raynes Victor & Mann LLP (57) ABSTRACT

Disclosed is a method, system, and program for displaying markings to electronic media, such as text, images, video clips, audio clips, etc., in an electronic media file. A marking file includes markings and address information indicating locations of electronic media in the electronic media file to which the markings apply. The marking file is created by receiving marking input entered into a graphical user interface (GUI) window displaying the electronic media on a monitor attached to the computer. The marking file is then stored as a separate file from the electronic media file. The electronic media file and marking file are processed to display the markings indicated in the marking file superimposed on the electronic media from the electronic media file on the monitor.

37 Claims, 4 Drawing Sheets

METHOD, SYSTEM, AND PROGRAM FOR STORING AND RETRIEVING MARKINGS FOR DISPLAY TO AN ELECTRONIC MEDIA FILE

CROSS-REFERENCE TO RELATED APPLICATIONS

This application is related to the co-pending and commonly-assigned patent applications, which applications are filed on the same date herewith and which applications are incorporated herein by reference in their entirety:

"Method, System, And Program For Marking-Up an Electronic Media File," by Hari Madduri, having Ser. No. 09/249,201; and "Method, System, and Program for Displaying Added Text to an Electronic Media File," by Hari Madduri, having attorney Ser. No. 09/249,203.

BACKGROUND OF THE INVENTION

1. Field of the Invention

The present invention relates to a method, system, and program for storing and displaying markings in an electronic media file and, in particular, displaying markings from multiple users.

2. Description of the Related Art

In current document editing systems, users typically enter markings and modifications to a document and store such markings and modifications with the document. A marking can be any highlighting, strikeout, line, font change, hand-written indication added to text, underlining, double underline, redline, bold, italics, etc. A highlighting is a thin color film through which the underlying text is visible. For group editing projects, a group member may edit and markup the document and transmit the revised and edited document to another group member for review and further editing. In such group editing environments, groups of users can edit a document on-line by entering textual notes into the document being edited. Such notes are typically entered into pop-up windows which appear in the document. The user may enter textual memos into the pop-up window.

U.S. Pat. No. 5,146,552, entitled "Method for Associating Annotation with Electronically Published Material," which is assigned to International Business Machines Corporation ("IBM"), the assignee of the subject patent application and which is incorporated herein by reference in its entirety, describes a program which allows a user to review and display annotations or notes created by the user or shared and exchanged between users with access to a copy of the same published electronic document. The annotations may be associated with a particular context within the document. Users can review and merge notes from other users, and display such notes with the electronic document.

Many of the current systems for editing and marking-up documents are intended for documents which are read/write capable, thereby allowing the user to make changes directly into the document. However, in many cases, a user may be viewing a document in a read-only format. For instance, a user may be reviewing a Hypertext Mark-Up Language (HTML) document with an HTML browser, e.g., NETSCAPE Communicator, the MICROSOFT Internet Explorer, Spry Mosaic, NCSA Mosaic, Lynx, Opera, GNUscape Navigator et. With such HTML browsers and other viewers for viewing read-only documents, such as the ADOBE Acrobat Reader, users typically cannot directly edit the HTML document while in viewing mode.*

Text editors, such as WORDPERFECT and MICROSOFT WORD, allow users to mark-up and edit a document. However, with such text editors, the user must save the modified and marked-up file over the original document or save the original and edited document in separate files. If many users are group editing a document, then difficulties may arise tracking the different versions reflecting the mark-ups and edits from different users in the network system.

There is thus a need in the art for an improved system, method, and program for storing and displaying markups to an electronic media file.

SUMMARY OF THE PREFERRED EMBODIMENTS

To overcome the limitations in the prior art described above, preferred embodiments disclose a method, system, and program for displaying markings to electronic media in an electronic media file. A marking file includes markings and address information indicating locations of electronic media in the electronic media file to which the markings apply. The marking file is created by receiving marking input entered into a graphical user interface (GUI) window displaying the electronic media on a monitor attached to the computer. The marking file is then stored as a separate file from the electronic media file. The electronic media file and marking file are processed to display the markings indicated in the marking file superimposed on the electronic media from the electronic media file on the monitor.

The electronic media file may include electronic media in the form of text, graphical images, video images, audio, three dimensional images, and any other media format known in the art. The electronic media may originate from the computer displaying the markings superimposed on the electronic media or from another location, such as a server over a network transmission line, e.g., the Internet or an Intranet.

In further embodiments when the electronic media includes text, the markings may be an indication to highlight at least one character of the text, an indication to mark a position in the text for an annotation or an indication of striking out at least one character.

In still further embodiments, a plurality of marking files may each include markings, address information indicating locations of the markings in the electronic media, and a color associated with the markings. An input device to a computer may provide selection input indicating at least two selected marking files. The markings from the selected marking files may then be displayed as superimposed onto the electronic media. If the markings are associated with a color and the markings in the selected marking files mark a same location of electronic media, a combination color comprised of the colors associated with the markings is displayed superimposed onto the electronic media.

In yet further embodiments, input indicating an overlap color associated with markings from at least two marking files is received. The markings that mark the same location of electronic media are displayed in the overlap color.

With preferred embodiments, users may cause the display of markings, such as highlightings, strikeouts, etc., from a marking file superimposed onto electronic media, such as text or images. In preferred embodiments, the marking file and electronic media file are separate files. In this way, the displayed overlay of the markings in the marking file onto the electronic media from the electronic media file does not alter the formatting, spacing or content of the electronic media file.

Preferred embodiments are particularly applicable to network environments where multiple users may edit a document. Each user may create a marking file of user specific markings in a color associated with that user. In this way, another user may select multiple marking files to view the markings from different users in the displayed text. The markings would be displayed in the color associated with the selected marking file to allow the user to distinguish markings among the users who created the markings. Moreover the user may select an overlap color to indicate overlapping markings from two particular users.

Still further, users in a network may share marking files indicating specific markings to a documents without altering the document. A user need only receive the marking file transmitted over a network if the user otherwise has a copy of the associated electronic media file to which the markings apply. Further, users may selectively display markings generated from other people without altering the underlying text document. This allows multiple users to make markings and edits to electronic media document without generating multiple versions of the electronic media file throughout the network.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Hardware and Software Environment

Figure 1:
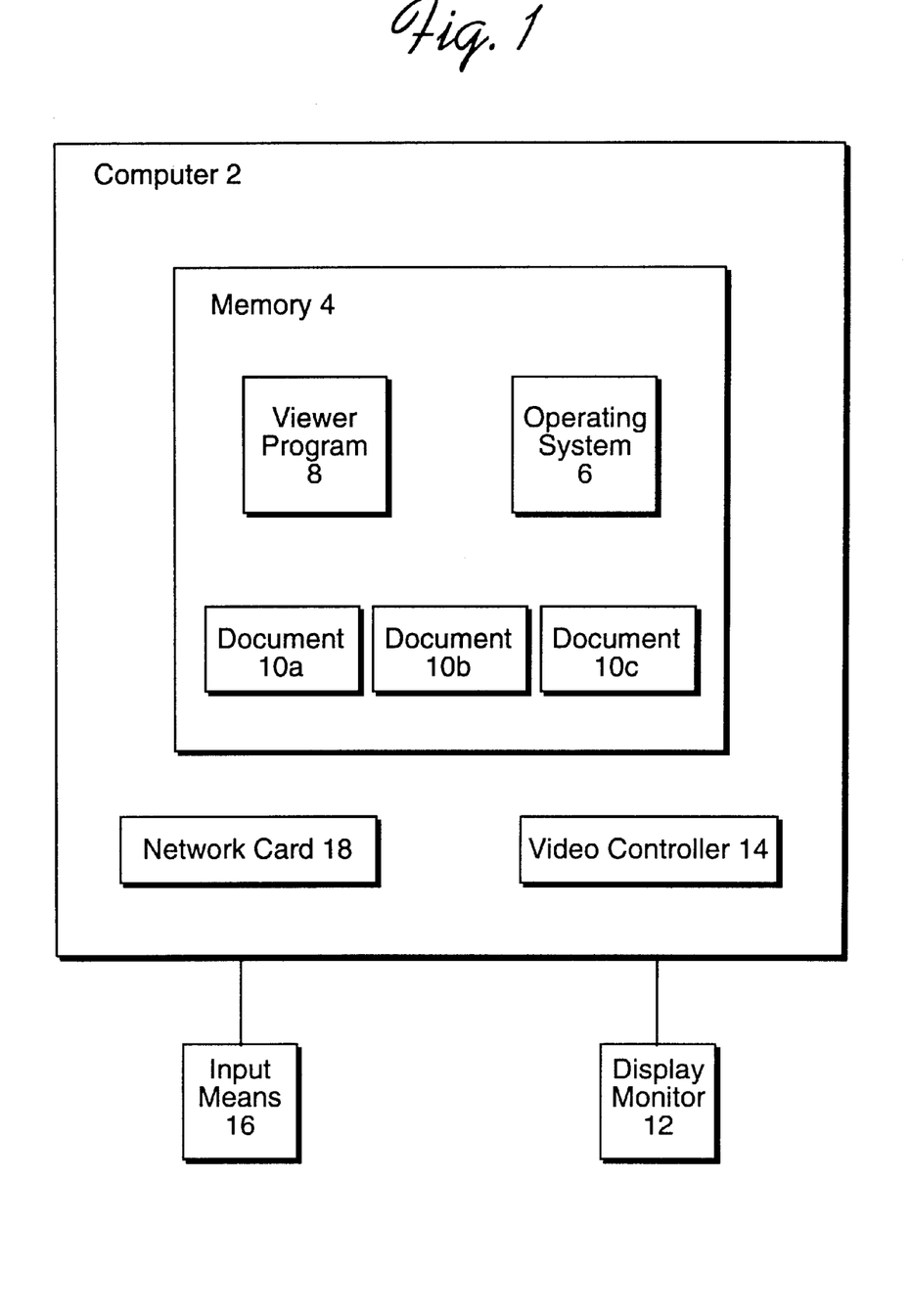
FIG. 1 is a block diagram illustrating a software and hardware environment in which preferred embodiments of the present invention are implemented.

FIG. 1 illustrates a hardware and software environment in which preferred embodiments of the present invention are implemented. A computer 2 includes a memory 4. The computer 2 may be a personal computer, workstation, mainframe, personal digital assistant (PDA), etc., operating under microprocessor control. The memory 4 may be any suitable volatile memory device known in the art, e.g., RAM, DRAM, SRAM, etc., or a combination of volatile and non-volatile memory devices, e.g., hard disk drives, to provide storage space for programs, whether they are being executed or not. If the memory 4 is comprised of volatile and non-volatile memory devices, then data and programs may be swapped between the volatile and non-volatile devices in a manner known in the art.

The memory 4 includes an operating system 6 and a viewer program 8. Certain preferred embodiments are described with respect to electronic media comprised of text. However, the documents 10a, b, and c including text may also include other electronic media content, such as graphical images, video clips, audio files, etc. In preferred embodiments, the documents 10a, b, and c are in a read only format. The operating system 6 may be any suitable operating system such as AIX®, OS/390™, UNIX, OS/2®, MVS™, WINDOWS, WINDOWS NT, etc.*

A user views and controls computer 2 operations via a display monitor 12, which may be any suitable display device known in the art. The computer 2 includes a video controller 14 to generate display control information and to control the display of data and graphics on the display monitor 12. The video controller 14 may be any suitable graphics card or video controller device known in the art. The computer 2 further includes an input means 16, which may be a keyboard, mouse, pen-stylus, voice activated input, touch-sensitive display screen, etc. Also included is a network card 18 to allow the computer 2 to communicate with other computers over a network, such as TCP/IP, LAN, WAN, ETHERNET, infrared communication means, etc. The network card 18 may be a modem or any other network card interface known in the art to allow the computer 2 to communicate with the network. In preferred embodiments, the computer 2 may communicate with other computers over the network to transfer documents 10a, b, and c. The other computers with which the computer 2 communicates may include the viewer program 8 to view, or view and add, markings in accordance with the preferred embodiments.

In preferred embodiments, a user inputs markings to the document 10a, b, and c while the document is displayed on the display 12. In preferred embodiments, the operating system 6 provides for a windows graphical display environment in which different operating system tasks are executed in different windows. Within the viewer program 8, the user would select, with the input means 16, a document 10a, b, or c to open in the viewer program 8. The selected document 10a, b, or c would be loaded into a volatile memory area of the computer, e.g., a RAM, DRAM, SRAM, etc. The video controller 14 would then generate display control information for document 10a, b, or c to display the electronic media within document 10a, b, or c on the display monitor 12.

When the user selects a marking file to display markings superimposed on the electronic media of the electronic media file, there are at least two possible methods to generate the display control information. With one method, the video controller 14 may generate markings directly into a copy of the document 10a, b, or c maintained in a volatile memory device as a temporary file. Such markings would not be stored in the document 10a, b, or c in non-volatile memory. The video controller 14 would then generate display control information for the modified document (temporary file) maintained in the volatile memory area to display the markings superimposed on the electronic media (text, images, etc.). With a second method, the video controller 14 could generate display control information for the markings and separately display the electronic media and markings on the screen such that the displayed markings are displayed superimposed onto the displayed electronic media. Those skilled in the art will appreciate that there are alternatives ways for a video controller 14 to generate and display data from two separate files.

The Viewer Program

The viewer program 8 includes viewer capabilities to allow the user to view documents 10a, b, or c comprised of multiple types of electronic media. The viewer program 8 includes the viewing capability of browser programs such as HTML browsers, e.g., Netscape Communicator, Microsoft Internet Explorer, etc, and may also include the capability of various add-on programs, such as video players and audio players, to enable the display and processing of different electronic media types. The documents 10a, b, and c (electronic media files) may include text in any text format known in the art, including HTML, ASCII, ANSI, Rich Text Format (RTF), a format specific to a word processor document (e.g., WordPerfect, Microsoft Word) or any other format known in the art for displaying text. The documents 10a, b, and c may also include other media types, such as images, pictures, video clips, sound clips, etc. In such case, the format of the document 10a, b, and c is capable of maintaining address information for multiple electronic media types. The viewer program 8 also includes the capability to allow a user to enter and display markings as superimposed onto the text or images of a displayed document 10a, b, and c, including highlighting of the text or images in different colors, addition of markings, strikeout of text or any modification or editing known in the art. These viewing and marking features are known in the art and included in many types of text editors.

In preferred embodiments, the viewer program 8 would display the document 10a, b, or c content in a single graphical window. Using the input means 16, the user would indicate markings and display such markings directly onto the content of the document 10a, b, c displayed in the window. The user may make markings by selecting or highlighting a particular section of the electronic media (text, image) and then selecting from a displayed menu or tool bar a particular type of marking to apply to the highlighted electronic media, e.g., redlining, strikeout, underlining, italics, bold, etc. Alternatively, the user may make markings by "free-hand" drawing markings using the mouse pointer or pen-stylus.

In preferred embodiments, the markings the user enters with the viewer program 8 are stored in a file separate from the document 10a, b, or c. Thus, the entered markings that are displayed superimposed on the document 10a, b, or c do not alter the format, spacing or content of the underlying document 10a, b, or c because the markings are stored separately. Further, in preferred embodiments, the viewer may be restricted to not allow the user to add markings that would alter the underlying structure of the document 10a, b or c, such as altering the positioning of text within the document. Moreover, because users may input markings to the document 10a, b or c and store the markings separately, a new version of the document is not created each time a user edits or revises the document.

Figure 2:
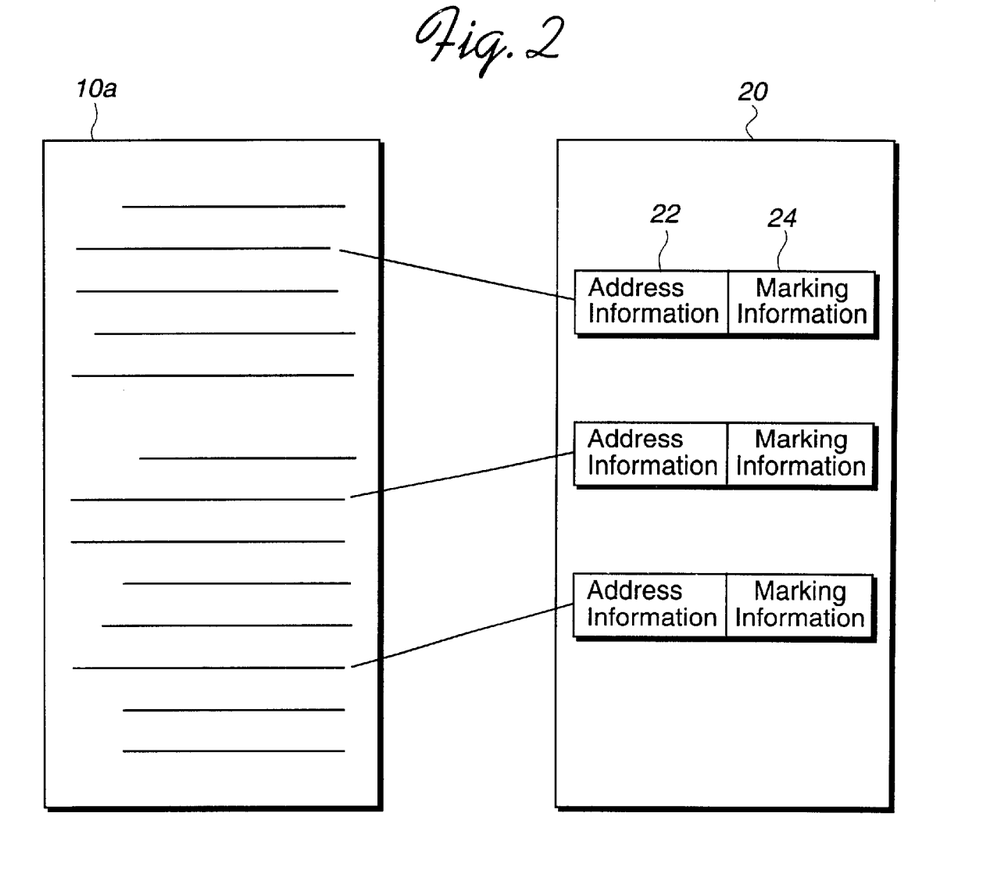
FIG. 2 illustrates the arrangement of a marking file in accordance with preferred embodiments of the present invention.

FIG. 2 illustrates a preferred embodiment of a markings file 20 which stores markings a user makes to a document, e.g., document 10a with the viewer program 8. The markings file 20, which is a separate file from the corresponding document 10a, includes address 22 and marking 24 information. The marking information 24 describes the type of marking made through the viewer program 8. The address information 22 describes the address or position of the described marking in the electronic media within the document 10a. The address information 22 maps the markings 24 to the document. The address information 22 would include information on the addressing context of the document 10a to properly locate the markings described in the modification information 24 to the electronic media, e.g., text, images, in the document 10a. A markings file 20 may include multiple instances or records of address 22 and markings 24 information for each marking and modification made.

The document 10a, b, c may be organized according to any document format or content addressing system known in the art. For instance, if the marked electronic media is text, then the address information 22 may indicate the start and end for the corresponding markings in the text as an offset number from the beginning of the document. Alternatively, text in the documents 10a, b, c may be addressed according to paragraph, wherein the paragraph is the addressable entity and text is addressed according to an offset within an addressable paragraph. In such case, paragraph delimiter information is used to identify the location of text in each paragraph grouping and the application of fonts, margins, and justification are dependent on accurately denoting the end of paragraph for each block of text in a document. If the text in the document 10a was grouped according to paragraphs, then the address information 22 would include such paragraph delimiter information to identify where the modifications apply in the document 10a. Further, documents may be addressed according to levels of objects or other sections. Addressing according to levels of objects permits addressing of non-textual electronic media, such as images. In embodiments where the documents 10a, b, c include non-textual data, such as images or video-clips, the documents 10a, b, c would include a format to address such images and/or video clips and portions therein within the document 10a, b, c.

The markings file 20 would also include document identification information to identify the document 10a, b, c to which the marking file 20 applies. This would prevent a user from applying a markings file 20 to a document that was not the document for which the markings were generated.

As discussed, the viewer program 8 permits any document markings known in the art, including strikeout, highlighting, underlining, double underline, redline, bold, italics, etc. Further, the marking information 24 may describe an annotation note added to the text. Still further, the user may add text to the electronic media. An addition to text is new text superimposed on the underlying text or image within the document 10a, b or c as described in related patent application, entitled "Method, System, and Program for Displaying Added Text to an Electronic Media File," having attorney docket no. AT9-98-928, which application was incorporated herein by reference above.

The viewer program 8 would further include menu options the user could selectively display in the GUI window in which the viewer program 8 is executing. Such menu options would include a feature to allow the user to retrieve one or more previously stored marking files 20. Upon selecting a marking file 20 for a displayed document, the video controller 14 would generate display control information to superimpose the markings on the text in the document 10a, b, c displayed on the display monitor 12. In preferred embodiments, the user may concurrently superimpose on electronic media markings from multiple marking files.

Preferred embodiments are particularly applicable to reading documents on-line and, in particular, documents, such as on-line books, provided in a read-only format. With the viewer program 8 of the preferred embodiments, the user may display a read only document and create and save markings to the document within the window in which the document is displayed. Users could also use the viewer program to comment upon the appearance or content of an image or video clip. Storing the markings would not modify the actual contents of the document 10a, b, c because the markings are stored separately in the marking file 20. Further, viewers in accordance with preferred embodiments do not allow the user to alter the format or positioning of the text in the underlying document. Preferred embodiments only allow the superimposition of markings over the underlying text.

With preferred embodiments, a user may enter a marking, annotation or addition to text and choose to have the marking to be displayed in a selected color. A user may then transmit the marking file 20 to another user over a network. In this way, a user at a computer 2 may maintain several marking files from different users, wherein the markings of each user are maintained in a different, distinctive color to identify the user that created the markings. A user, using the menu selections displayed in the viewer program 8, may then select the marking files for multiple users. The computer 2 would generate display information to superimpose the markings from multiple marking files from different users over the electronic media within the document 10a, b or c.

When a user selects a marking file to import and superimpose on the document 10a, b or c, in preferred embodiments, the viewer program 8 would display a dialog box on the monitor 12 to allow the user to selectively associate a color with the markings from the selected markings file 20. In preferred embodiments, if there are markings from other marking files already displayed, then the dialog box would present the user colors to select that are not currently being used to display markings. In this way, the same color will not be used to display markings from different marking files. Moreover, when the marking files are generated by different reviewers of the document 10a, b or c, the user can select a color to associate with a particular reviewer when displaying that reviewers markings superimposed on the electronic media of the document 10a, b or c. If the user does not select a particular color to associate with the markings from a selected marking file, then the viewer program 8 may select a default color. The default color may be a color provided by the user who created the marking file or may be a color the viewer program 8 selects in a manner to avoid conflicting with colors already used to display markings.

In further embodiments, the viewer program 8 may only allow the user to select a color to display markings that not only does not conflict with the current colors used to display markings but also does not conflict with the color in which the user is entering markings onto the electronic media. For instance, if the user is marking displayed text in red and the user selects to display the markings from another markings file, then the viewer program 8 would not permit the user to select red to display the markings from the selected marking file. In further embodiments, the viewer program 8 may include an algorithm to determine similar colors that may conflict, such as red or magenta. In such case, the viewer program 8 would not allow the user to select a color that is different yet conflicts with the colors used to display the current markings in the document.

If markings from different users overlap in the displayed document, then the overlapping markings may cause the display of a color that is a combination of the colors of the overlapping markings. For instance, yellow may be used to display editor A's markings and red may be used to display editor B's markings (wherein editor one and editor two's markings are maintained in separate marking files). In such case, superimposing markings from editor A and editor B on the same section of electronic media would display the color formed from the combination of the overlapping marking colors, which in the example would be orange.

The computer 2 may store the combination color formed by superimposing markings from different users into a temporary copy of the document in volatile memory. The video controller 14 may then generate display information from this temporary file including the markings from different users and the content of the electronic media. Alternatively, the video controller 14 may separately display each users markings on the display monitor 12. The natural combined color would form on the display monitor 12 as a result of the display effect of superimposing the display of different colors. Those skilled in the art will appreciate that there are numerous ways to display markings from different users to superimpose overlapping markings and colors resulting from such overlapping markings onto electronic media.

When selecting a marking file to display on the displayed electronic media, the user may select the color used to display the selected markings. In this way, a user can identify colors with particular reviewers that created the markings. The user may also select a color to display overlapping markings from two or more other users. This selected color may differ from the color formed by the combination of the colors associated with the overlapping markings. For instance, if editor A's markings are in yellow and editor B's markings are in red, then the user may select the color green to display overlapping markings from editor A and editor B. The viewer program 8 may further display a legend showing the colors associated with a particular editor and the color associated with overlapping markings from multiple editors.

Users may indicate their own markings by means other than color, such as a displayed pattern of the markings or different fonts or formats, e.g., bold, italics, font size, font type, etc. Moreover, the user may select to block out or not display markings from one or more marking files for selected pages or portions of the underlying text in document 10a, b or c.

Preferred embodiments are particularly useful for allowing a user to view the markings, notes or suggested revisions from different users. Moreover, a user may select markings indicated by the author or creator of the document, a famous critic or other esteemed individual to view how especially insightful people marked-up the document 10a, b or c. If the markings include annotation notes associated with particular locations in the document 10a, b or c, then the user may review the notes others made into the text or image. In group editing environments, the editor may review the suggested modifications of different people and then determine which final revisions to apply based on the received markings.

Because, in preferred embodiments, the marking file 20 is maintained separate from the document, users need only exchange marking files over a network and not the entire document. However, a user that wants to display the markings from a marking file 20 with electronic media from the document 10a, b or c must maintain a copy of the document 10a, b or c to which the marking file applies 20. Otherwise, the user would not be able to display the markings superimposed on the underlying electronic media content as the content is stored separately in the document 10a.

Figure 3:
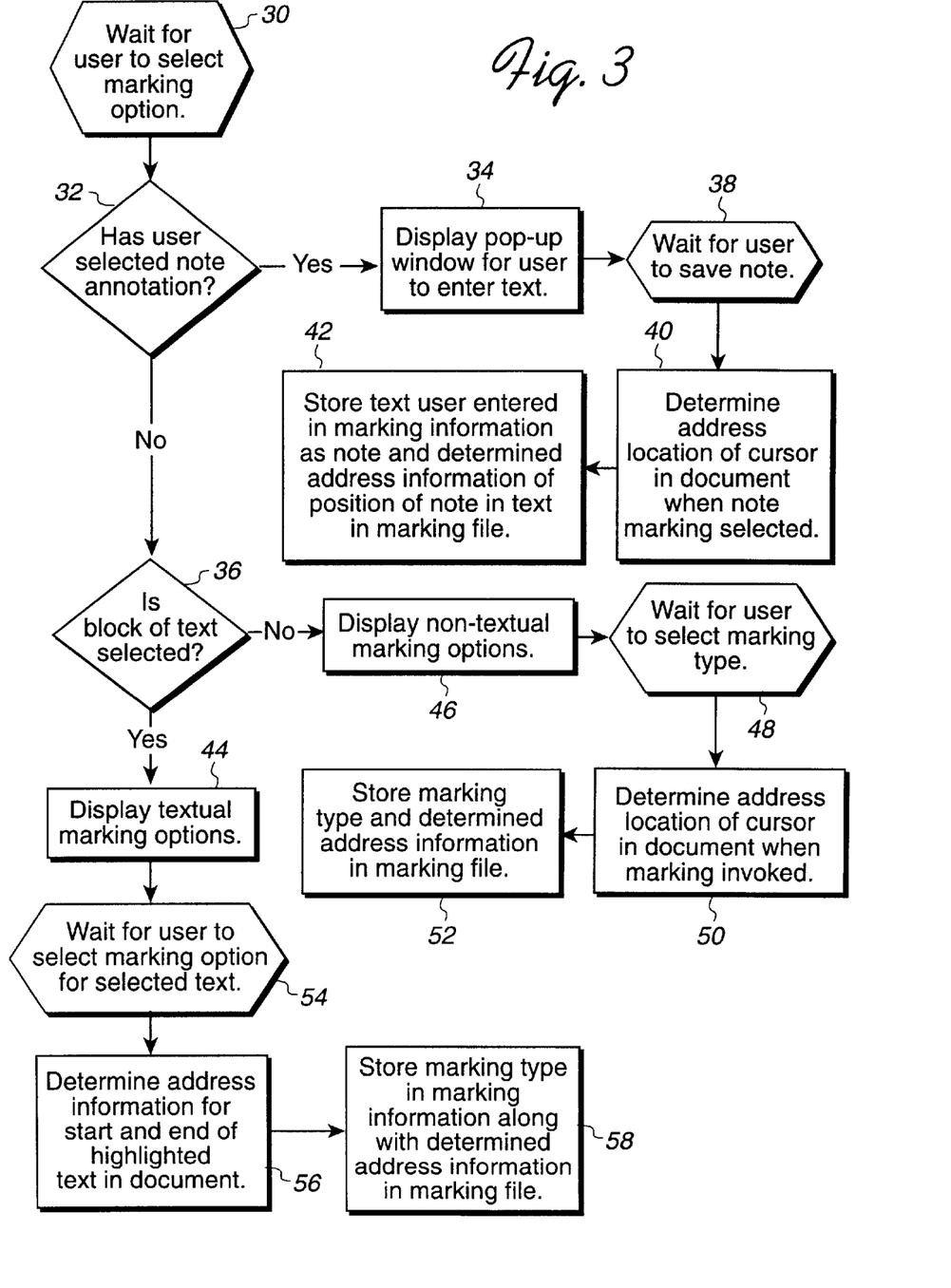
FIG. 3 illustrates program logic to create and store markings in accordance with preferred embodiments of the present invention.
Figure 4:
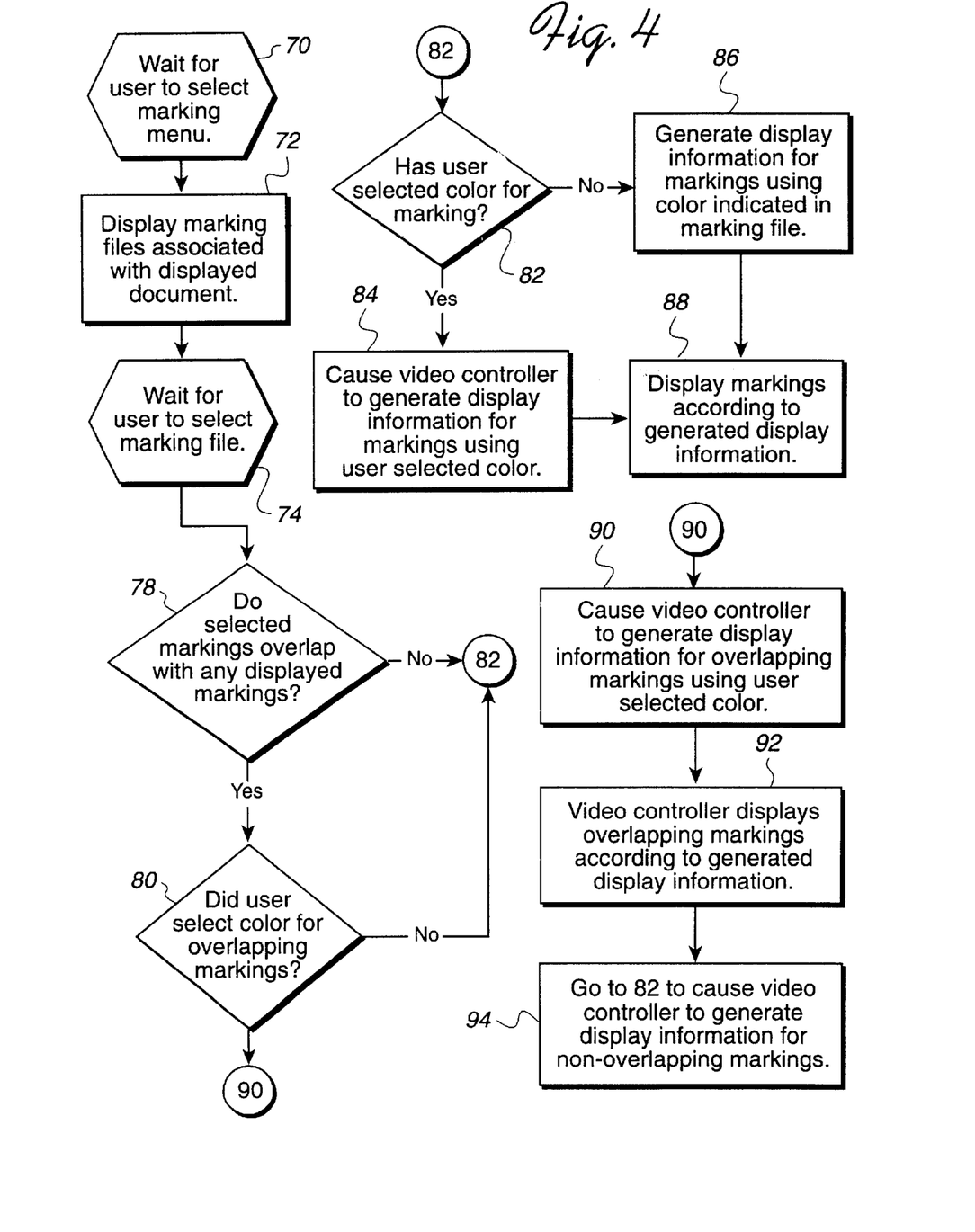
FIG. 4 illustrates program logic to select and display marking files in accordance with preferred embodiments of the present invention.

FIGS. 3 and 4 illustrate logic implemented in the viewer program 8 to process markings to a document 10a, b or c. Control begins at block 30 which represents the viewer program 8 waiting for the user to select a marking option. As discussed, the user may select marking options from a menu bar displayed in the window in which the viewer program 8 is executing. Alternatively, the user may display marking options upon selecting a mouse button or "hot" key from the keyboard input means 16. After the user selects a marking option, control transfers to block 32 where the viewer program 8 determines whether the user has selected the note annotation option to enter annotation text in the document. If so, control transfers to block 34; otherwise, control transfers to block 36. At block 34, the viewer program 8 displays a pop-up window in the window in which the viewer program 8 is executing in which the user may enter annotation text. Control then transfers to block 38 where the viewer program 8 waits for the user to save the note or close the note pop-up window without saving note annotations. If the user closes the pop-up window or note annotation without saving text, then the program would return to block 30 to wait for further user action. Otherwise, control transfers to block 40 where the viewer program 8 determines the address location of a pointer or cursor the user positioned with the input means 16 in the displayed document 10*a, b* or *c* content when the annotation marking feature was invoked. Control then transfers to block 42 where the viewer program 8 stores the annotative text the user entered in the pop-up window in the marking information 24 field and the determined address information of where the marking was made in the electronic media in the address information field 22 of the separate marking file 20.

If the user did not select the note annotation marking feature, then control transfers to block 36 where the viewer program 8 determines whether a block of text in the displayed document is selected, e.g., highlighted with the cursor or pointer. If so, control transfers to block 44; otherwise, control transfers to block 46 where the viewer program 8 displays marking options. The marking options may allow the user to add markup to the location of the cursor or pointer in the document. Alternatively, the user may tag the location of the cursor or pointer to associate a bookmark or tag to the location of the pointer. The marking or tag information would be stored in a separate marking file 20, such that the marking or tagging would not alter the format, spacing or content of the document 10*a* in which the marking is indicated. From block 46, control transfers to block 48 where the viewer program 8 waits for the user to select a marking or tagging option to add to the document 10*a, b* or *c*. After selection, control transfers to block 50 where the viewer program 8 determines the address location of the cursor or pointer in the displayed document when the marking or tagging option was invoked. Control then transfers to block 52 where the viewer program 8 stores the marking tagging type in the marking information 22 field and the determined address location, where the mark or tag was made, in the address information field 24.

If a block of text, such as a plurality of characters, is selected, then at block 44 the viewer program 8 displays marking options that may apply to a block of text, referred to herein as textual marking options, such as highlighting, redlining, strikeout, or other markings to be made to the selected text. Further, a tagging option may be provided to allow the user to tag or bookmark the selected text. The user may select a color for the marking, e.g., a red highlight. Control then transfers to block 54 where the viewer program 8 waits for the user to select a displayed marking option. After the user selects a marking option or tag for the selected text, control transfers to block 56 where the viewer program 8 determines address information for the start and end in the document 10*a, b* or *c* of the highlighted text. Control then transfers to block 58 which represents the viewer program 8 storing the marking type (including color information if selected) in a marking information field 24 along with the determined address information in an address information 22 field.

In this way, a user can enter various markings or tags to a document without altering the actual document. Moreover, because, in preferred embodiments, the markings are stored in a separate marking file 20, the user's markings file can be transmitted to other users for review with the document without generating additional version numbers of the document and without having to transmit the actual document. The underlying marked-up document need not be transferred as long as the user applying the marking file 20 has a copy of the underlying document 10*a, b* or *c* to which the markings apply. This feature reduces network traffic because those groups editing the document do not need to transfer the actual document, which could be quite large, every time they send a copy of their markings to others involved in editing the document.

FIG. 4 illustrates logic implemented in the viewer program 8 to display the markings on the displayed document 10*a, b* or *c*. Control begins at block 70 which represents the viewer program 8 waiting for the user to select the markings menu. Upon selection, control transfers to block 72 which represents the viewer program 8 displaying one or more marking files 20 associated with the document 10*a, b* or *c* being displayed in the active window on the display 12. Control transfers to block 74 where the viewer program 8 waits for the user to select with the input means 16 one of the displayed marking files 20. In preferred embodiments, after the user selects a marking file 20, a dialog box may be displayed in which the user would select a color in which to display the markings form the selected marking file. The markings would then be displayed in the selected color. The user may also be presented with a dialog box in which to select a color to display overlapping markings from separate marking files that mark the same location of electronic media, i.e., the same portion of text or same part of an image.

Control then transfers to block 78 where the viewer program 8 processes the selected marking file to determine whether the selected markings overlap any markings currently displayed in the document 10*a, b, c* displayed on the monitor 12. If so, control transfers to block 80; otherwise control transfers to block 82. At block 82, the viewer program 8 determines whether the user selected a color for the selected markings. If so, control transfers to block 84 to cause the video controller 14 to generate the display control information for the selected markings in the user selected color. Otherwise, control transfers to block 86 to cause the video controller 14 to generate the display control information for the selected markings in the color indicated in the marking information 24 of the marking file 20 or in a default color maintained by the viewer program 8. From blocks 84 or 86, control transfers to block 88 where the video controller 14 displays the markings according to the generated display control information. As discussed, the video controller 14 may generate the display control information and store the display control information in a video memory for display on the display monitor 12. The video controller 14 may generate the display control information to display over any electronic media from the document 10*a, b, c* or markings presently displayed. Alternatively, the viewer program 8 may store the markings directly in a temporary file including the document, and the video controller 14 would generate the display control information from such temporary file.

If the markings from the selected marking file overlap any markings already displayed on the display monitor 12, then control transfers from block 78 to block 80 which represents the viewer program 8 determining whether the user selected a color for the specific overlapping markings. If so, control transfers to block 90; otherwise, control transfers to block 82 to display the markings in the displayed document 10*a, b, c*. The video controller 14 may generate display information to display the markings over the current displayed document, including any currently displayed markings. In such case, any markings from the selected marking file will be displayed as directly superimposed over the displayed electronic media, including markings from other marking files. To the extent the superimposed markings are in one color and the displayed electronic media (including other markings) that overlap the location of the selected markings are in another color, a color that is a natural combination of the overlapping marking colors will be displayed. If the user selected a specific overlap color for the overlapping markings, then control transfers to block 90 to cause the video controller 14 to generate display information for the overlapping markings in the user selected overlap color. Control transfers to block 92 where the video controller 14 displays the overlapping markings according to the display control information. Control then transfers to block 94 which represents the viewer program 8 proceeding to block 72 to cause the video controller 14 to generate display control information to display the non-overlapping markings.

With preferred embodiments, a user can select markings created by multiple users to display over the document displayed on the display monitor 12. In this way, the user can view markings, comments or highlighting of the electronic media from different users with access to the underlying document 10*a, b* or *c*. Further as discussed, with preferred embodiments, the user can select desired color schemes for any markings in a file and for specific overlapping marking combinations. Because the user can manipulate markings without altering the underlying document, only one version of the underlying document need be maintained by each user reviewing the markings.

Alternative Embodiments and Conclusions

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many markings may be made to this configuration without departing from the scope of the present invention.

The computer 2, operating system 6, viewer program 8, and video controller 14 were described as separate components in preferred embodiments. However, in alternative embodiments, any one of the functions described as being performed by any one or combination of components 2, 6, 8, and 14 may be performed by another component 2, 6, 8 or 14, or combination thereof.

In preferred embodiments, the logic of FIGS. 3 and 4 is implemented as software logic in the viewer program 8. Certain of the logic, such as the logic for generating display control information, may be implemented in the viewer program 8 and/or the video controller 14, or in other hardwired or softwired logic within the computer 2. Moreover, certain of the logic described as being implemented in the video controller 14 may be implemented in the viewer program 8 or elsewhere in the computer 2. The preferred logic of FIGS. 3 and 4 is for illustrative purposes, such that steps may be added, removed, and the sequence of steps changed.

The format of the document may be capable of addressing numerous types of electronic media within a document 10*a, b, c,* including text, images video clips, audio, etc. In such case, the marking file would include address information to address the location of particular markings to an image, video clip, or audio clip. For instance, an input device, such as a pen-stylus, mouse, touch sensitive screen, joystick, etc., may be used to make markings to a displayed image or video clip frame. In such case, the address information could address a particular location within the image or a location within an image within a frame of a video clip. For instance, various graphic programs, such as Microsoft Paint, allow a user to enter and store markings in different colors onto an imported image. Preferred embodiments would save the markings along with address information mapping the markings to the image in a file separate from the image.

Preferred embodiments were described as storing the markings in a file separate from the document to which the markings apply to avoid altering the format, spacing or content of the underlying document. In alternative embodiments, the markings may be stored in the same file as the underlying document in a manner that does not alter the format, spacing or content of the underlying document. For instance, the marking file 20 may be stored as an object within the file in which the underlying document is stored in such a manner that the marking object will not alter the underlying document. In this way, the marking object is a module of the document that may be invoked and superimposed onto the content of the underlying document without ever altering the content of the underlying document to which the markings were applied.

A non-textual marking, such as a sound (beep or other noise) may be made to an audio clip to sound when the marked portion of the audio clip is played. Alternatively, a pop-up window including annotative text may be displayed when a particular section of the audio file is played. Those skilled in the art will appreciate that there are numerous ways to address locations within an image, video clip, audio file or other electronic media types for the purpose of positioning markings that are maintained in a file separate from the underlying electronic media being marked.

In summary, preferred embodiments in accordance with the present invention disclose a method, system, and program for displaying markings to electronic media in an electronic media file. A marking file includes markings and address information indicating locations of electronic media in the electronic media file to which the markings apply. The marking file is created by receiving marking input entered into a graphical user interface (GUI) window displaying the electronic media on a monitor attached to the computer. The marking file is then stored as a separate file from the electronic media file. The electronic media file and marking file are processed to display the markings indicated in the marking file superimposed on the electronic media from the electronic media file on the monitor.

Preferred embodiments were described with respect to displaying markings in color and combinations of colors superimposed onto text. However, in alternative embodiments, the colored markings and multiple markings of different colors forming combined colors may be superimposed on an image, such as a graphical image or video clip. In such case, the color of the superimposed color marking may be affected by the coloring of the underlying image to which the marking applies.

The foregoing description of the preferred embodiments of the invention has been presented for the purposes of illustration and description. It is not intended to be exhaustive or to limit the invention to the precise form disclosed. Many markings and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

*NETSCAPE is a registered trademark of the Netscape Communications Corporation; MICROSOFT is a registered trademark of Microsoft Corporation; ADOBE is a registered trademark of Adobe Systems Incorporated; WORDPERFECT is a registered trademark of the Corel Corporation; AIX, OS/390, MVS, and OS/2 are trademarks of IBM; WINDOWS and WINDOWS NT are registered trademarks of Microsoft Corporation; UNIX is a registered trademark licensed by the X/Open Company LTD.

What is claimed is:

1. A method for displaying markings to electronic media in a computer, comprising:

providing an electronic media file including electronic media;

providing a plurality of marking files including markings and address information indicating locations in the electronic media within the electronic media file to which the markings apply by receiving marking input entered into a graphical user interface (GUI) window displaying the electronic media on a monitor attached to the computer;

storing the marking files as separate files from the electronic media file;

receiving selection input indicating at least two selected marking files;

receiving color selection input indicating colors to associate with the markings for each selected marking file, wherein at least two selected marking files are associated with different colors; and processing the electronic media file and the selected marking files to display the markings indicated in the selected marking files superimposed on the electronic media from the electronic media file on the monitor, wherein each marking is displayed in the color associated with the marking file in which the marking is included.

2. The method of claim 1, wherein the electronic media file includes electronic media that is a member of the set of electronic media comprising text, graphical images, video images, audio, and three dimensional images.

3. The method of claim 1, wherein the electronic media includes text and the markings include an indication to highlight at least one character of the text.

4. The method of claim 1, wherein the electronic media includes text and the markings include an indication to mark a position in the text for an annotation.

5. The method of claim 1, wherein the electronic media includes text and the marking file indicates a color in which to display the markings, wherein the marking is displayed in the color in the text.

6. The method of claim 1, wherein the markings in the selected marking files mark a same location of the electronic media, further comprising the step of displaying a combination color, comprised of the colors associated with the markings that mark the same location of the electronic media, superimposed onto the displayed same location of electronic media.

7. The method of claim 1, further comprising the step of:

receiving selection input indicating an overlap color associated with markings from at least two marking files;

determining whether markings from the selected marking file mark a same location of electronic media;

determining whether the markings that mark the same location of electronic media are the markings associated with the overlap color; and displaying the markings that mark the same location of electronic media in the overlap color superimposed onto the displayed electronic media after determining that the markings that mark the same location are associated with the overlap color.

8. A method for displaying a file on a computer system having a display and input means, the method comprising:

displaying a first file, on the display, in a non-editable view of the file;

receiving marking input through the input means in a window in which the first file is displayed, during the viewing;

displaying the marking input overlaid on the displayed first file while maintaining the first file as unchanged;

storing the marking input and a position of the marking input in a second and third files while maintaining the first file as unchanged;

receiving color selection input indicating colors to associate with the markings in the second and third files, wherein the second and third files are associated with different colors; and processing the first file and the second and third files to display the markings indicated in the second and third files overlaid on the displayed first file, wherein each marking is displayed in the color associated with the marking file in which the marking is included.

9. A method for displaying a file on a computer system having a display and input means, the method comprising:

viewing a first file, on the display, in a non-editable view of the file;

providing marking input through the input means in a same window in which the first file is displayed during the viewing;

viewing the marking input as overlaid on the displayed first file;

storing, in a second and third files, the marking input and a position of the marking input while maintaining the first file as unchanged;

receiving color selection input indicating colors to associate with the markings in the second and third files, wherein the second and third files are associated with different colors; and processing the first file and the second and third files to display the markings indicated in the second and third files overlaid on the displayed first file, wherein each marking is displayed in the color associated with the marking file in which the marking is included.

10. A method for displaying a file on a computer system having a display and input means, the method comprising:

displaying a first file in a non-editable view of the file;

receiving input from an input device in a window displaying the first file, during the viewing, for specifying at least one alteration to the first file during a mark-up mode instance;

displaying the at least one alteration and the first file while maintaining the first file as unchanged;

storing each mark-up mode instance, having at least one alteration and a position of each of the at least one alterations, in separate files with the first file remaining unedited; and enabling a subsequent display of a specific one of the mark-up mode instances, while maintaining the first file as unchanged, by
  i) displaying the first file;
  ii) receiving color selection input indicating colors to associate with the alterations in the separate files, wherein at least two separate files are associated with different colors;
  iii) reading in the alterations, by position, from the separate files of the specific mark-up mode instance; and
  iv) changing each position within the displayed file with the read in alteration, wherein the changes from the read in alterations are displayed in the color associated with the file from which the alteration is read.

11. A method for displaying a file on a computer system having a display and input means, the method comprising:

displaying a first file in a non-editable view of the file;

receiving marking input from an input device in a window displaying the first file, during the viewing, for specifying at least one alteration to the first file during each one of a plurality of mark-up mode instances;

storing each instance, having at least one alteration and a position of each of the at least one alterations, in separate files with the first file remaining unedited; and enabling a subsequent display of a plurality of the instances, while maintaining the first file as unchanged, by
  i) displaying the first file;
  ii) receiving color selection input indicating colors to associate with the alterations in the separate files, wherein at least two separate files are associated with different colors;
  iii) reading in the alterations, by position, from each of the separate files for each of the specific instances; and
  iv) changing each position within the displayed first file with the read in alterations, wherein the changes from the read in alterations are displayed in the color associated with the file from which the alteration is read.

12. The method of claims 10 or 11 further comprising a user interface enabling a selection of at least one of the instances.

13. The method of claims 10 or 11 wherein the at least one alteration consists of at least one start and end position to be highlighted.

14. A system for displaying electronic media, comprising:
a computer;
a display monitor for displaying electronic media generated by the computer;
a memory accessible to the computer including an electronic media file including electronic media;
program logic executed by the computer, comprising:
  (i) means for creating a plurality of marking files including markings and address information indicating locations in the electronic media within the electronic media file to which the markings apply;
  (ii) means for storing the marking files as separate files from the electronic media file;
  (iii) means for receiving selection input indicating at least two selected marking files;
  (iv) means for receiving color selection input indicating colors to associate with the markings for each selected marking file, wherein at least two selected marking files are associated with different colors; and
  (v) means for displaying the markings from the selected marking files superimposed on the electronic media from the electronic media file, wherein each marking is displayed in the color associated with the marking file in which the marking is included.

15. The system of claim 14, wherein the electronic media file includes electronic media that is a member of the set of electronic media comprising text, graphical images, video images, audio, and three dimensional images.

16. The system of claim 14, wherein the electronic media includes text and the markings include an indication to highlight at least one character of the text.

17. The system of claim 14, wherein the electronic media includes text and the markings include an indication to mark a position in the text for an annotation.

18. The system of claim 14, wherein the electronic media is text and the marking file indicates a color in which to display the markings, wherein the marking is displayed in the color in the text.

19. The system of claim 14, wherein the markings in the selected marking files mark a same location of the electronic media, and wherein the program logic further comprises means for displaying a combination color comprised of the colors, associated with the markings that mark the same location of electronic media, superimposed on the same location of electronic media.

20. The system of claim 14, wherein the program logic further comprises:
means for receiving input from the input device indicating an overlap color associated with markings from at least two marking files;
means for determining whether markings from the selected marking file mark a same location of electronic media;
means for determining whether the markings that mark the same location of electronic media are the markings associated with the overlap color; and
means for displaying the markings that mark the same location of electronic media in the overlap color superimposed on the same location of electronic media.

21. A computer system having a display, input means, and means for receiving a file, the system comprising:
means for viewing a first file in a non-editing mode;
means for enabling in a window displaying the first file receipt of marking input from an input device;
means for enabling a display of the marking input and the first file while maintaining the first file as unchanged;
means for storing the marking input and a position of the marking input in a second and third files while maintaining the first file as unchanged;

means for receiving color selection input indicating colors to associate with the markings in the second and third files, wherein the second and third files are associated with different colors; and means for processing the first file and the second and third files to display the markings indicated in the second and third files overlaid on the displayed first file, wherein each marking is displayed in the color associated with the marking file in which the marking is included.

22. A computer system having a display, input means, and means for receiving a file, the system comprising:

means for viewing a first file in a non-editing mode;

means for receiving input from an input device in a window displaying the first file, during the viewing, for specifying at least one alteration to the first file during a mark-up mode instance;

means for enabling a display of the at least one alteration and the first file while maintaining the first file as unchanged;

means for storing each mark-up mode instance, having at least one alteration and a position of each of the at least one alterations, in separate files with the first file remaining unedited; and means for enabling a subsequent display of a specific one of the mark-up mode instances, while maintaining the first file as unchanged, by
  i) displaying the first file;
  ii) receiving color selection input indicating colors to associate with the alterations in the separate files, wherein at least two separate files are associated with different colors;
  iii) reading in the alterations, by position, from the separate file of the specific mark-up mode instance;
  iv) changing each position within the displayed file with the read in alteration, wherein the changes from the read in alterations are displayed in the color associated with the file from which the alteration is read.

23. A computer system having a display, input means, and means for receiving a file, the system comprising:

means for viewing a first file in a non-editing mode;

means for receiving marking input from an input device in a window displaying the first file, during the viewing, for specifying at least one alteration to the first file during each one of a plurality of mark-up mode instances;

means for storing each instance, having at least one alteration and a position of each of the at least one alterations, in separate files with the first file remaining unedited; and means for enabling a subsequent display of a plurality of the instances, while maintaining the first file as unchanged, by
  i) displaying the first file;
  ii) receiving color selection input indicating colors to associate with the alterations in the separate files, wherein at least two separate files are associated with different colors;
  iii) reading in the alterations, by position, from each of the separate files for each of the specific instances; and
  iv) changing each position within the displayed first file with the read in alterations, wherein the changes from the read in alterations are displayed in the color associated with the file from which the alteration is read.

24. The system of claims 22 or 23 further comprising a user interface enabling a selection of at least one of the instances.

25. The system of claims 22 or 23 wherein the at least one alteration consists of at least one start and end position to be highlighted.

26. An article of manufacture for use in programming a computer system to display markings to electronic media displayed on a display monitor in communication with the computer system, the article of manufacture comprising computer usable media accessible to the computer system, wherein the computer usable media includes at least one computer program that causes the computer system to perform the steps of:

providing an electronic media file including electronic media;

providing marking files including markings and address information indicating locations in the electronic media within the electronic media file to which the markings apply by receiving marking input entered into a graphical user interface (GUI) window displaying the electronic media on a monitor attached to the computer;

storing the marking files as separate files from the electronic media file;

receiving selection input indicating at least two selected marking files;

receiving color selection input indicating colors to associate with the markings for each selected marking file, wherein at least two selected marking files are associated with different colors; and processing the electronic media file and the selected marking files to display the markings indicated in the selected marking files superimposed on the electronic media from the electronic media file on the, wherein each marking is displayed in the color associated with the marking file in which the marking is included.

27. The article of manufacture of claim 26, wherein the electronic media file includes electronic media that is a member of the set of electronic media comprising text, graphical images, video images, audio, and three dimensional images.

28. The article of manufacture of claim 26, wherein the electronic media includes text and the markings include an indication to highlight at least one character of the text.

29. The article of manufacture of claim 26, wherein the electronic media includes text and the markings include an indication to mark a position in the text for an annotation.

30. The article of manufacture of claim 26, wherein the electronic media includes text and the marking file indicates a color in which to display the markings, wherein the marking is displayed in the color in the text.

31. The article of manufacture of claim 26, wherein the markings in the selected marking files mark a same location of electronic media, further comprising the step of displaying a combination color, comprised of the colors associated with the markings that mark the same location of electronic media, superimposed onto the displayed same location of electronic media.

32. The article of manufacture of claim 26, further comprising the step of:

receiving selection input indicating an overlap color associated with markings from at least two marking files;

determining whether markings from the selected marking file mark a same location of electronic media;

determining whether the markings that mark the same location of electronic media are the markings associated with the overlap color; and displaying the markings, that mark the same location of electronic media, in the overlap color superimposed onto the displayed text after determining that the markings that mark the same location are associated with the overlap color.

33. A computer program, on a computer usable medium, comprising:

means for viewing a first file in a non-editing mode;

means for enabling, within a window displaying the first file, receipt of marking input from an input device; and means for enabling a display of the marking input and the first file while maintaining the first file as unchanged;

means for storing the marking input and a position of the marking input in a second file while maintaining the first file as unchanged;

means for receiving color selection input indicating colors to associate with the markings in the second and third files, wherein the second and third files are associated with different colors; and means for processing the first file and the second and third files to display the markings indicated in the second and third files and overlaid on the displayed first file, wherein each marking is displayed in the color associated with the marking file in which the marking is included.

34. A computer program, on a computer usable medium, comprising:

means for viewing a first file in a non-editing mode;

means for receiving input from an input device in a window displaying the first file, during the viewing, for specifying at least one alteration to the first file during a mark-up mode instance;

means for enabling a display of the at least one alteration and the first file while maintaining the first file as unchanged;

means for storing each mark-up mode instance, having at least one alteration and a position of each of the at least one alterations, in separate files with the first file remaining unedited; and means for enabling a subsequent display of a specific one of the mark-up mode instances, while maintaining the first file as unchanged, by i) displaying the first file;

ii) receiving color selection input indicating colors to associate with the alterations in the separate files, wherein at least two separate files are associated with different colors;

iii) reading in the alterations, by position, from the separate file of the specific mark-up mode instance; and iv) changing each position within the displayed file with the read in alteration, wherein the change from the read in alterations are displayed in the color associated with the file from which the alteration is read.

35. A computer program, on a computer usable medium, comprising:

means for viewing a first file in a non-editing mode;

means for receiving input from an input device, during the viewing, for specifying at least one alteration to the first file during each one of a plurality of mark-up mode instances;

means for storing each instance, having at least one alteration and a position of each of the at least one alterations, in separate files with the first file remaining unedited; and means for enabling a subsequent display of a plurality of the instances, while maintaining the first file as unchanged, by i) displaying the first file;

ii) receiving color selection input indicating colors to associate with the alterations in the separate files, wherein at least two separate files are associated with different colors;

iii) reading in the alterations, by position, from each of the separate files for each of the specific instances; and iv) changing each position within the displayed first file with the read in alterations, wherein the change from the read in alterations are displayed in the color associated with the file from which the alteration is read.

36. The computer program, on a computer usable medium, of claims 34 or 35 further comprising a user interface enabling a selection of at least one of the instances.

37. The computer program, on a computer usable medium, of claims 34 or 35 wherein the at least one alteration consists of at least one start and end position to be highlighted.

* * * * *